United States Patent [19]

Guy et al.

[11] Patent Number: 5,948,373

[45] Date of Patent: *Sep. 7, 1999

[54] FREE RADICAL OXIDATION INSTALLATION FOR TREATING LIQUID EFFLUENTS CONTAMINATED BY ORGANIC SUBSTANCES

[75] Inventors: Christophe Guy; Marzouk Benali; `Eve Ostiguy, all of Montréal, Canada

[73] Assignee: Corporation De L'Ecole Polytechnique, Montreal, Canada

[*] Notice: This patent is subject to a terminal disclaimer.

[21] Appl. No.: 08/827,699

[22] Filed: Apr. 9, 1997

Related U.S. Application Data

[63] Continuation-in-part of application No. 08/543,602, Oct. 16, 1995, Pat. No. 5,641,412.

[30] Foreign Application Priority Data

Oct. 16, 1996 [CA] Canada .................................... 2187982

[51] Int. Cl.[6] .............................. D21C 11/00; F23G 7/04
[52] U.S. Cl. ......................... 422/185; 422/261; 110/238; 110/242; 110/346
[58] Field of Search .................................... 110/238, 242, 110/346; 210/758; 422/185, 261, 256; 261/75

[56] References Cited

U.S. PATENT DOCUMENTS

| | | | |
|---|---|---|---|
| 3,748,081 | 7/1973 | Hummell | 431/7 |
| 3,958,518 | 5/1976 | Yoshida | 110/7 S |
| 4,018,879 | 4/1977 | Winnen | 423/481 |
| 4,425,856 | 1/1984 | Szilagyi | 110/346 |
| 4,438,706 | 3/1984 | Boday et al. | 110/238 |
| 4,520,741 | 6/1985 | Carbeau et al. | 110/344 |
| 4,526,529 | 7/1985 | Bernard et al. | 431/9 |
| 4,632,690 | 12/1986 | Colwell et al. | 65/134 |
| 4,688,495 | 8/1987 | Galloway | 110/250 |
| 4,974,530 | 12/1990 | Lyon | 110/346 |
| 5,022,332 | 6/1991 | Ding | 110/346 |
| 5,170,727 | 12/1992 | Nielsen | 110/346 |
| 5,238,665 | 8/1993 | Lerner | 423/240 S |
| 5,245,937 | 9/1993 | Nakase et al. | 110/346 |
| 5,354,962 | 10/1994 | Mizuno et al. | 219/121.52 |
| 5,363,781 | 11/1994 | Chang et al. | 110/250 |
| 5,376,354 | 12/1994 | Fisher et al. | 423/659 |
| 5,384,051 | 1/1995 | McGinness | 210/761 |
| 5,515,794 | 5/1996 | Kassman et al. | 110/261 |
| 5,641,412 | 6/1997 | Guy et al. | 210/758 |

OTHER PUBLICATIONS

"Direct Contact Heat Transfer—A Better Way to High Efficiency and Compactness" Rao et al., The Canadian Journal of Chemcial Engineering, vol. 62, Jun. 1984, pp. 319–325.

"Development of a Novel Direct Contac Heat Transfer System for Carrying Out Combustion in a Flowing Stream of Water" D. Nagaraja Rao, Thesis, Chemical and Petroleum Engineering Dept. pp. iii–ix.

"Treatment Technologies for Solvent Conataining Wastes" M. Breton et al., Pollution Technologies Review No. 149, pp. 372–432.

"Elimination of the Phenolic Aqueous Wastes Using New Chemical Oxidation Processes" Debellefontaine et al., Revue des sciences de l'eau, 5(4), 1992, pp. 555–572.

Primary Examiner—Nina Bhat
Attorney, Agent, or Firm—Griffin, Butler Whisenhunt & Szipl, LLP

[57] ABSTRACT

In the installation for decontaminating a liquid effluent contaminated by at least one organic substance, a gaseous combustible is burned in a reactor to produce a flame containing hydroxyl free radicals OH° and oxygen $O_2$ and that flame is centered on the geometrical axis of the reactor. A helical flow of liquid effluent is produced on the inner cylindrical wall of the reactor to cause a direct contact between the hydroxyl free radicals and the organic substance contaminating the liquid effluent. Having hydroxyl free radicals present, the organic substance is oxidized in liquid phase. The high temperature of the flame enables completion of the oxidation of the organic substance, in liquid phase, by means of the oxygen $O_2$ present in the flame. At the outlet of the reactor, the liquid and gaseous products are separated; the liquid product is collected while the gaseous product is evacuated.

13 Claims, 8 Drawing Sheets

FIG_7

FREE RADICAL OXIDATION INSTALLATION FOR TREATING LIQUID EFFLUENTS CONTAMINATED BY ORGANIC SUBSTANCES

This application is a continuation-in-part of Ser. No. 08/543,602, filed Oct. 16, 1995, now U.S. No. 5,641,412, issued Jun. 24, 1997.

BACKGROUND OF THE INVENTION

1. Field of the Invention

The present invention relates to an installation using a free radical oxidation reaction to treat liquid effluents contaminated by at least one organic substance.

2. Brief Description of the Prior Art

The industrial liquid effluents are often contaminated by organic substances such as phenol, benzene, toluene, chloro- or nitro-benzene, methanol, xylene, styrene, and other volatile or halogenated organic compounds. The main sources of such effluents are: treatment/disposal processes for industrial waste waters and liquid wastes, oil refineries and petrochemical plants, pulp and paper mills, foundries and metal refineries, metal/plastic product manufacturing, organic chemicals plants, tanneries, food industry and mineral industry. The numerous, available processes for treating such liquid effluents can be divided into three categories: biological processes, physical processes and chemical processes. A combination of biological, physical and/or chemical processes may also be used.

The efficiency of the biological processes in destroying organic substances can be as high as 97%. However, certain factors such as a concentration of organic matter higher than 500 mg/l or lower than 5 mg/l, and/or a temperature lower than 10° C. may adversely affect the efficiency of such biological processes.

The basic concept of the prior art physical processes is to transfer one organic substance toward another one. These physical processes present two drawbacks: they are selective in the treatment of the liquid effluent, and they require storage and/or disposal of the eliminated contaminants.

The chemical processes use conventional oxidation agents such as chlorine, chlorine dioxide, potassium permanganate, hydrogen peroxide, ozone, ultraviolet radiations, sulphite ions, etc. They are often limited in regard of the volume of liquid effluent to be treated. A prior art process is characterized by a wet oxidation with air, without flame, and is restricted by severe operation conditions: pressures of the order of 3 000 kPa to 300 000 kPa.

OBJECTS OF THE INVENTION

An object of the present invention is therefore to provide a decontamination installation capable of substantially eliminating the above discussed drawbacks of the prior art.

Another object of the present invention is to provide an installation for conducting free radical oxidation of liquid effluents contaminated by organic substances, having an increased efficiency for destroying organic substances and that at a minimal cost.

SUMMARY OF THE INVENTION

More particularly, in accordance with the present invention, there is provided an installation for decontaminating a liquid effluent contaminated by at least one organic substance, comprising:

a reactor having an outlet and an inner wall defining a geometrical axis;

a burner supplied with a gaseous combustible to produce in this reactor a flame centered on the geometrical axis and including free radicals and oxygen;

liquid effluent supply means for producing a flow of liquid effluent on the inner wall of the reactor to cause a direct contact between (a) the flame containing free radicals and oxygen and (b) the organic substance contaminating the liquid effluent of said flow, and thereby oxidize in liquid phase the organic substance contaminating the liquid effluent; and a liquid/air separator for separating liquid and gaseous products leaving the outlet of the reactor.

The liquid effluent may contain an organic mixture of a first easily oxidized species and a second refractory species, so that aqueous-phase oxidation reactions proceeding according to a free-radical mechanism and being characterized by an induction period followed by a rapid reaction phase occur in the reactor. As a non limitative example, the first species comprises toluene and the second species comprises phenol.

The present invention also relates to an installation for decontaminating a liquid effluent contaminated by at least one organic substance, comprising:

a reactor having an outlet and an inner, generally cylindrical wall defining a geometrical axis;

a burner supplied with a gaseous combustible and a comburant gas to produce in the reactor a flame centered on the geometrical axis and including free radicals and oxygen $O_2$;

liquid effluent supply means for injecting the liquid effluent tangentially in the reactor and producing a helical flow of liquid effluent on the inner, generally cylindrical wall of the reactor; and a liquid/air separator for separating liquid and gaseous products leaving the outlet of the reactor.

Advantageously, (a) the gaseous combustible comprises natural gas and the comburant gas is selected from the group consisting of ambient air, oxygen-enriched air, and pure oxygen, (b) the burner comprises means for adjusting the length of the flame, and (c) the reactor, inner wall and geometrical axis are generally horizontal or vertical.

In accordance with a preferred embodiment of the installation, the reactor comprises mechanical means, for example physical barrier means selected from the group consisting of grooves and grids, for increasing the time of residence in the reactor of the liquid effluent. The reactor may further comprise non mechanical aerodynamic means for increasing the time of residence of the liquid effluent.

The objects, advantages and other features of the present invention will become more apparent upon reading of the following non restrictive description of a preferred embodiment thereof, given by way of example only with reference to the accompanying drawings.

DETAILED DESCRIPTION OF THE PREFERRED EMBODIMENTS

Figure 1:
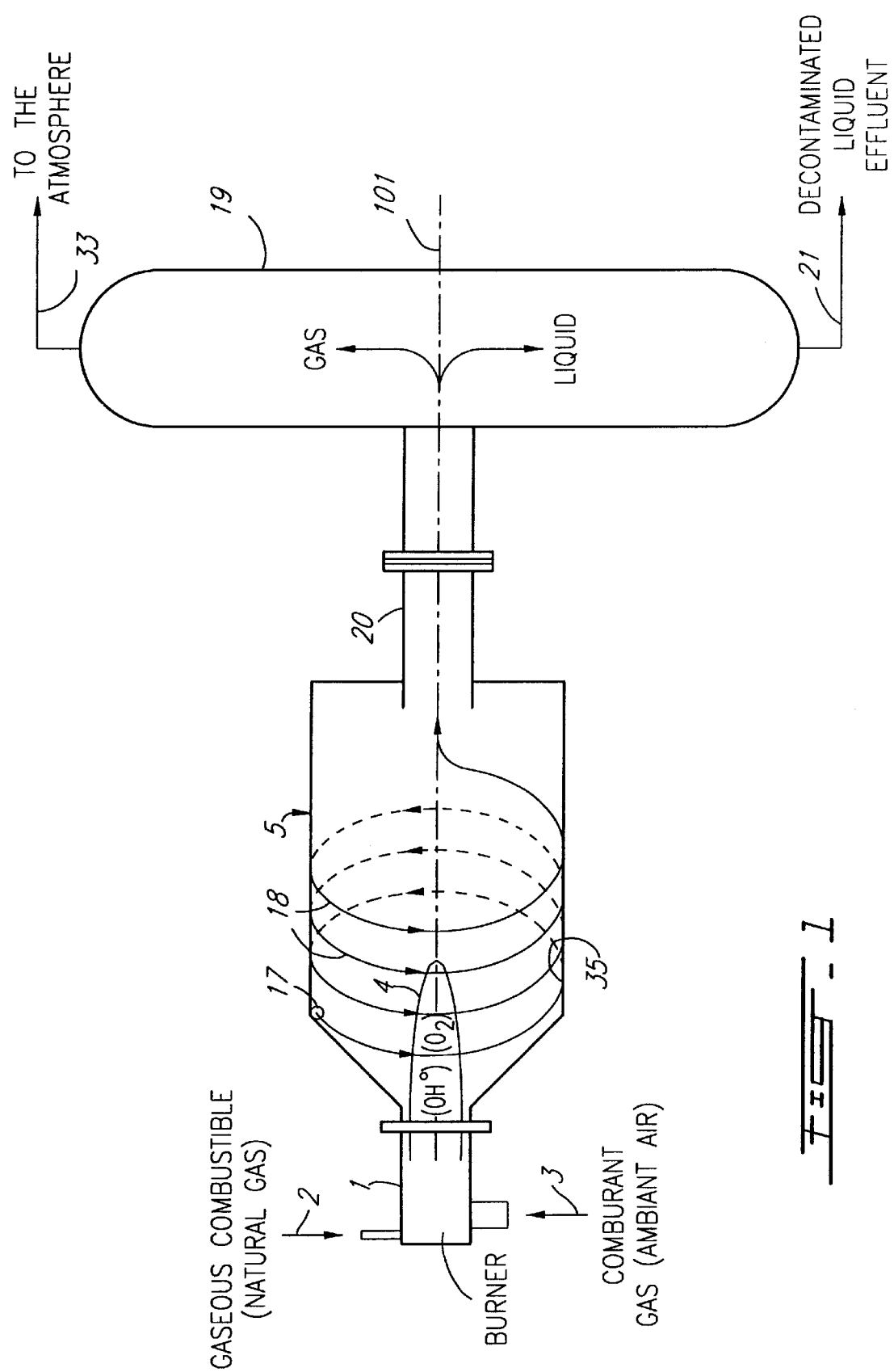
FIG. 1 is a schematic diagram of an installation according to the invention comprising a generally horizontal reactor, for conducting free radical oxidation of liquid effluents contaminated by organic substances.
Figure 2:
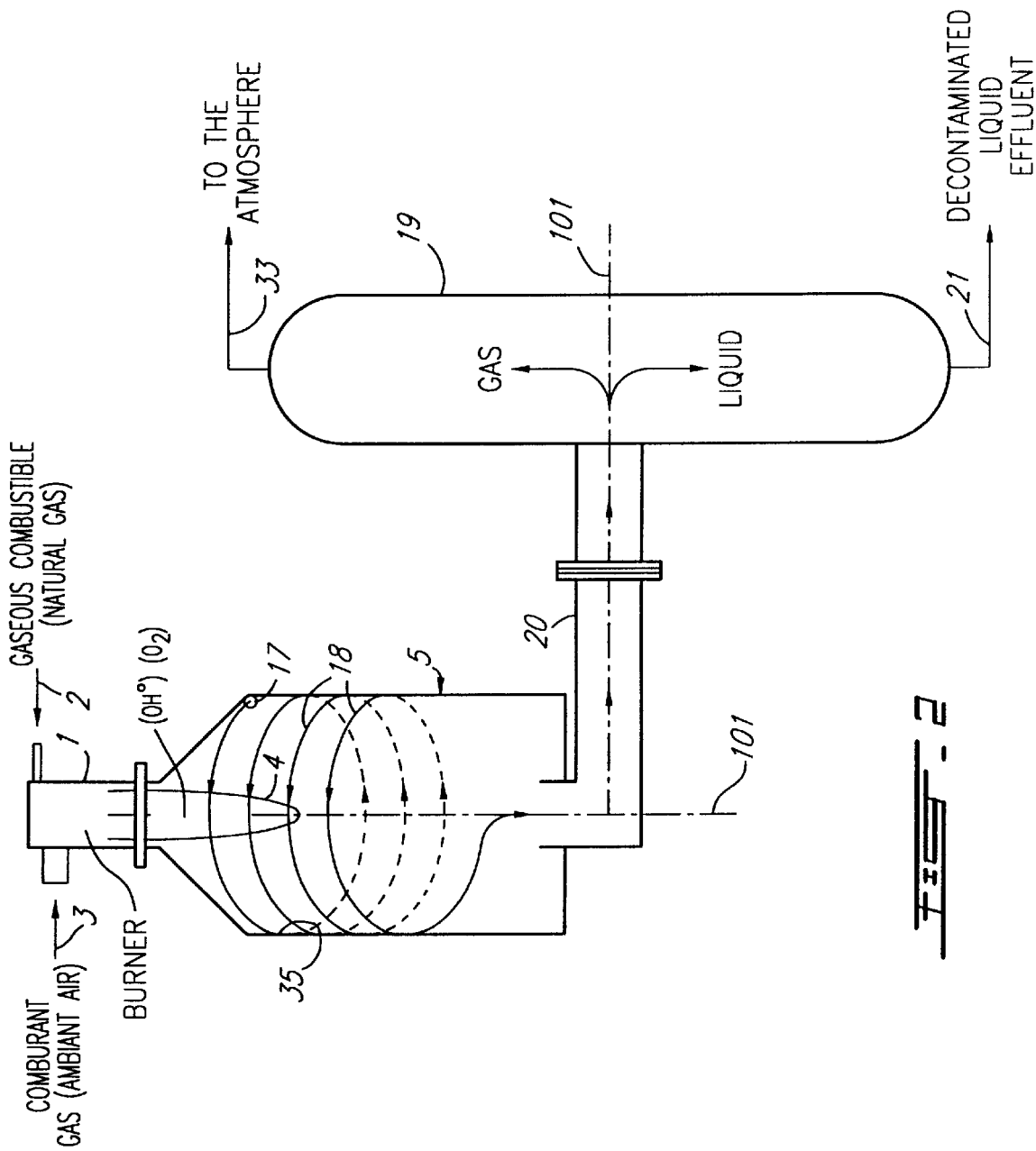
FIG. 2 is a schematic diagram of an installation according to the invention comprising a generally vertical reactor, for conducting free radical oxidation of liquid effluents contaminated by organic substances.
Figure 3:
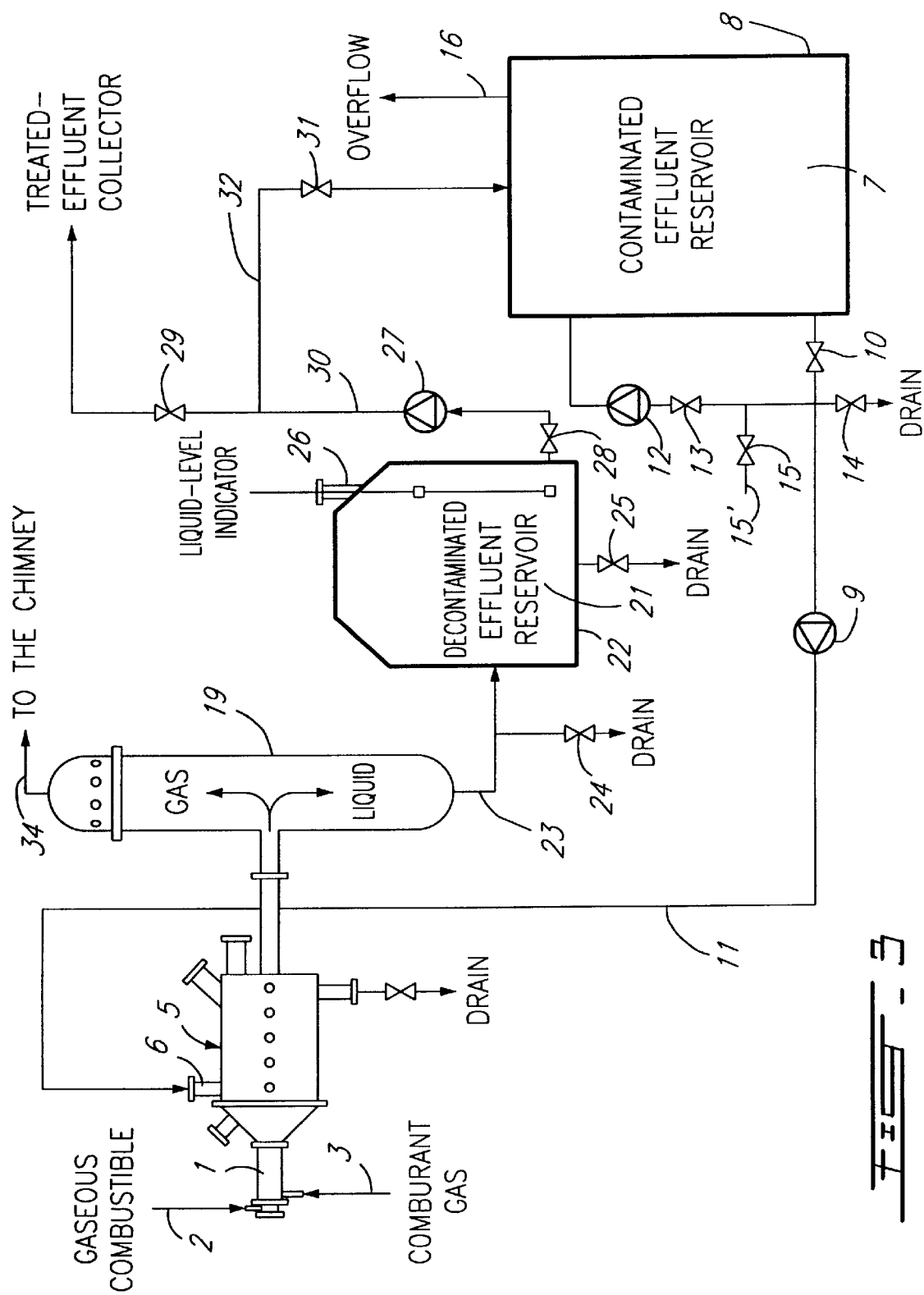
FIG. 3 is a schematic diagram of an installation in accordance with the present invention, for treating liquid effluents contaminated by organic substances.

FIGS. 1 and 2 are schematic diagrams of an installation in accordance with the present invention, for decontaminating a liquid effluent contaminated by at least one organic substance. FIG. 3 is a schematic diagram of a more complete version of the installation of FIGS. 1 and 2.

As illustrated in FIGS. 1 and 2, the installation comprises a burner 1 to generate free radicals such as $OH°$, $CH_3°$, $CH_2°$, $CHO°$, etc. through combustion of a gaseous combustible. More specifically, for that purpose, the burner 1 is supplied with a gaseous combustible 2 and a comburant gas 3 to produce a flame 4 (FIGS. 1 and 2).

The installation of FIGS. 1 and 2 also comprises a reactor 5 having an inner, generally cylindrical wall defining a longitudinal, geometrical axis 101 (FIGS. 1 and 2). The reactor 5 is also provided with an inlet 6 (FIG. 3) and presents the general geometry a hydrocyclone. As illustrated in FIGS. 1 and 2, the flame 4 is produced in the reactor 5 and is generally coaxial, i.e. centered on the axis 101. As illustrated in FIG. 1, the reactor 5 and its geometrical axis 101 may be generally horizontal. FIG. 2 illustrates that the reactor 5 as well as the geometrical axis 101 thereof may be generally vertical.

The liquid effluent 7 (FIG. 3) contaminated by at least one organic substance is stocked in a reservoir 8 and supplied from the reservoir 8 to the inlet 6 of the reactor 5 through a pump 9, a valve 10 and a line 11.

Another pump 12 is provided to mix the different constituents of the liquid effluent 7 and thereby form an uniform mixture. To that effect, pump 12 pumps liquid effluent 7 from the bottom portion of the reservoir 8 through the valve 10 and another valve 13, and returns the pumped liquid effluent 7 to the top portion of the reservoir 8 (valves 14 and 15 being then closed).

Valve 14 can be opened to drain the line 11 and the reservoir 8 through the valve 10. Valve 15 and line 15' provides for access to the contaminated liquid effluent 7, for example to add an oxidizing agent to that effluent 7. Finally, the reservoir 8 comprises an overflow 16.

The contaminated liquid effluent 7 supplied to the inlet 6 is injected tangentially in the reactor 5 through a tangentially oriented nozzle 17 (FIGS. 1 and 2) so as to produce on the generally cylindrical inner wall 35 of the reactor 5 a helical flow 18 of contaminated liquid effluent 7.

With the geometry of the arrangement of FIGS. 1 and 2, the helical flow 18 produces a direct and intimate contact of the liquid effluent 7 with the free radicals of the flame 4 to cause oxidation, in liquid phase, of said at least one organic substance contaminating the liquid effluent 7. The helical flow 18 also increases the surface of contact between the free radicals $OH°$ present in the flame 4 and the liquid effluent 7. The high temperature of the flame 4 contributes to the performance of this free radical oxidation reaction. Simultaneously, the high temperature of the flame 4 enables completion of the process of oxidation, in liquid phase, of the said at least one organic substance by means of the excess oxygen present in the flame 4.

Figure 5:
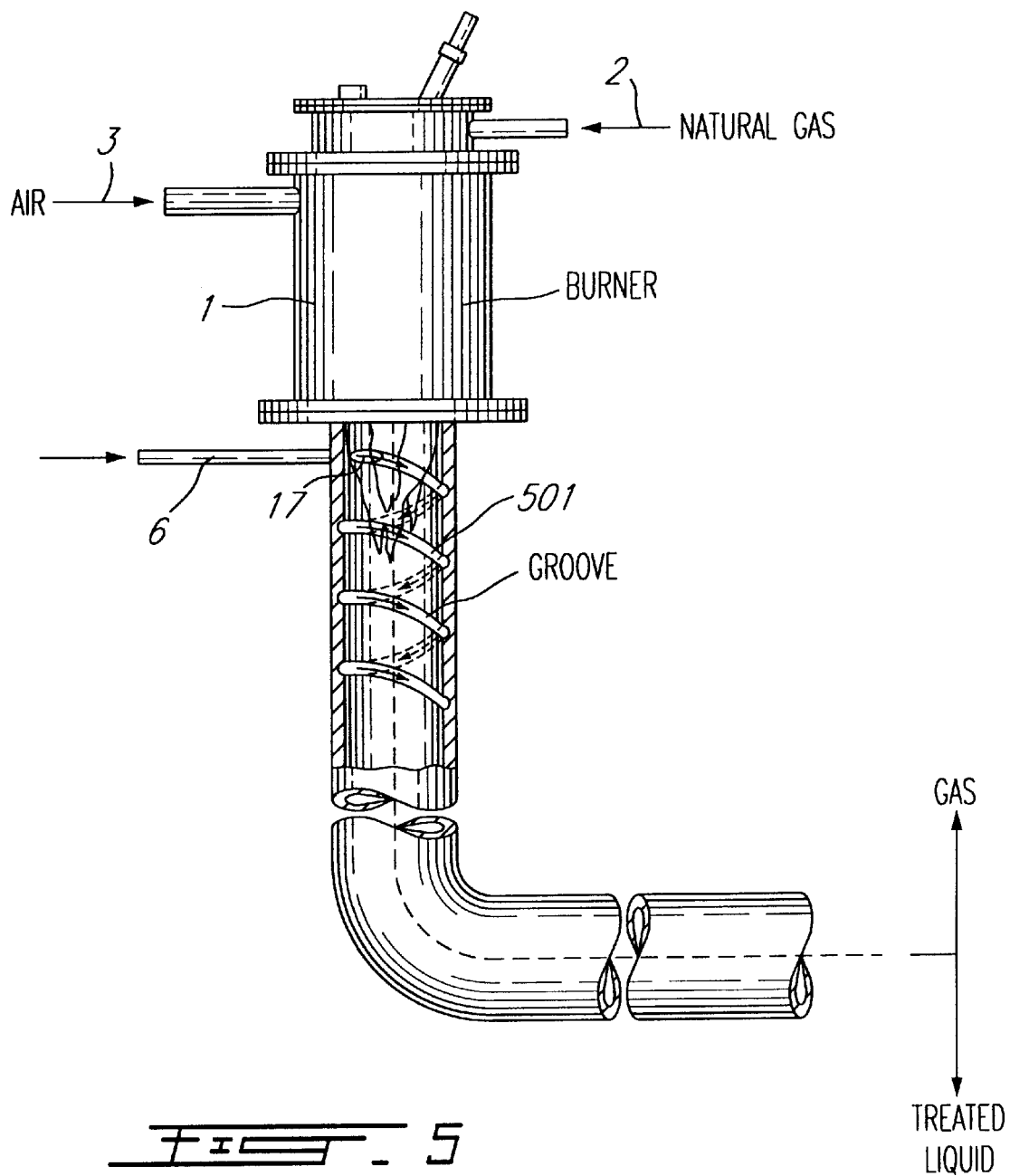
FIG. 5 is a schematic diagram of a burner and reactor forming part of the installation of FIGS. 1–3, in which the reactor comprises an inner, generally cylindrical wall formed with a helical groove for guiding a helical flow of liquid effluent on this inner wall of the reactor.
Figure 6:
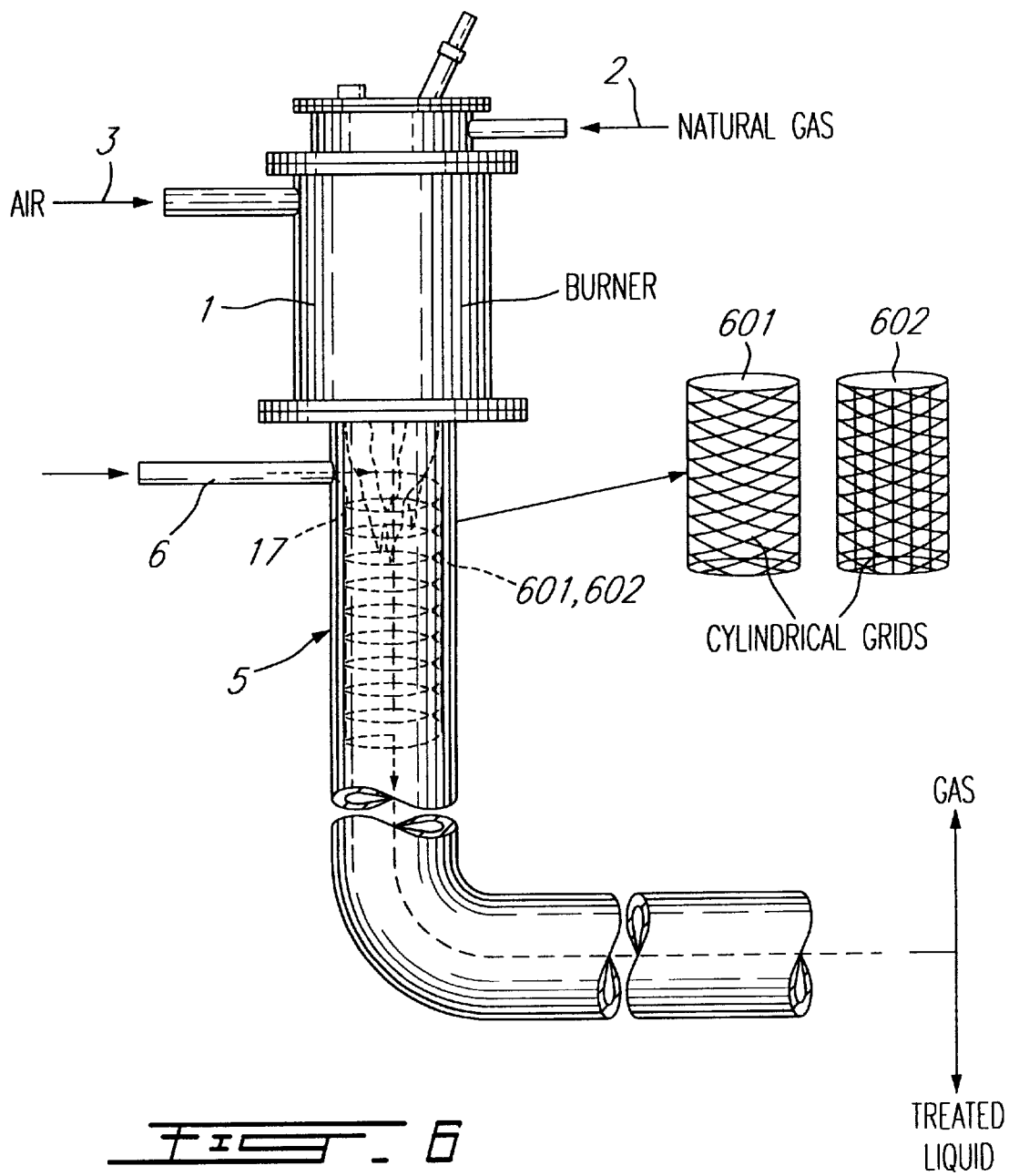
FIG. 6 is a schematic diagram of a burner and reactor forming part of the installation of FIGS. 1–3, in which the reactor comprises an inner, generally cylindrical wall provided with a cylindrical grid for guiding a helical flow of liquid effluent on this inner wall of the reactor.

It is within the scope of the present invention to provide the reactor 5 with a smaller diameter as illustrated in FIGS. 5 and 6. As also illustrated in FIG. 5 and 6, it is also within the scope of the present invention to provide the reactor 5 with mechanical and/or non mechanical tools to increase the residence time of the helically flowing liquid effluent 17 in this reactor 5. The mechanical tools may comprise physical barrier means such as:

a helical groove 501 (FIG. 5) for guiding the helical flow of liquid effluent 17;

a cylindrical grid such as 601 and 602 (FIG. 6) again for guiding the helical flow of liquid effluent 17; and baffles (not shown) and/or any other geometric shapes.

The non mechanical tools may be of the aerodynamic type (not shown).

A liquid oxidizing agent such as potassium permanganate can be added to the effluent 7, for example through the valve 15 and the line 15'; this oxidizing agent is then injected generally tangentially in the reactor 5 along with the effluent 7.

Also, a gaseous oxidizing agent such as ozone can be injected axially in the reactor 5 to further improve the performance of the above mentioned free radical oxidation reaction.

A vertical, generally cylindrical liquid/gas separator 19 is connected to the outlet 20 of the reactor 5 to separate the liquid and gaseous phases of the products leaving the reactor 5. The structure of such liquid/gas separators are well known to those of ordinary skill in the art and, accordingly, will not be further described in the present specification. However, it should be mentioned that the upper portion of the separator 19 has an inner lining (not shown) with a large contact area to promote the separation of the treated liquid effluent from the hot gaseous products leaving the reactor 5.

Also, a device (not shown) can be installed to recuperate the energy contained in the hot gaseous products leaving the reactor 5. Moreover, the upper portion of the liquid/gas separator 19 may be connected to a device for scrubbing the hot gaseous products, the latter device forming a post-treatment chamber.

The liquid extracted by the liquid/gas separator 19 is the decontaminated liquid effluent 21. The decontaminated liquid effluent 21 from the separator 19 is supplied through a line 23 (FIG. 3) to a decontaminated effluent reservoir 22 in which the decontaminated liquid effluent 21 accumulates. Draining of the line 23 is provided for through a valve 24 while draining of the effluent-collecting reservoir 22 is provided for through a valve 25. The effluent-collecting reservoir 22 finally includes a liquid level indicator 26.

Decontaminated effluent 21 from the reservoir 22 can be transferred to a treated effluent collector (not shown) through a pump 27, a valve 28, a valve 29, and a line 30 (valve 31 being then closed). It should be pointed out here that the pump 27 can be automatically activated when the decontaminated liquid effluent accumulating in the reservoir 22 reaches a predetermined level detected by the liquid-level indicator 26. Decontaminated effluent 21 from the reservoir 22 can also be returned to the contaminated effluent reservoir 8 for further decontamination thereof through the pump 27, the valve 28, valve 31 and lines 30 and 32 (valve 29 being then closed).

The gaseous products 33 (FIGS. 1 and 2) leaving the liquid/gas separator 19 comprises gaseous substances produced by the above mentioned oxidation reaction and eventually combustion residue from the flame 4. As illustrated in FIG. 3, the gaseous products 33 can be evacuated for example through a line 34 to a chimney (not shown).

EXAMPLE NO. 1

The following example relates to the free radical oxidation of waste water contaminated with phenol $C_6H_5OH$. However, it should be kept in mind that the process in accordance with the present invention can also be applied to the decontamination of liquid effluents contaminated by organic substances other than phenol.

Referring to FIGS. 1, 2 and 3, natural gas 2 and ambient air 3 are supplied to the burner 1 to produce the flame 4 containing hydroxyl free radicals OH° and oxygen $O_2$. The comburant gas can be oxygen-enriched air and/or pure oxygen as well. Preferably, the burner 1 will produce a rich mixture of gaseous combustible 2 and comburant gas 3, and will provide for adjustment of the length of the flame 4.

The major constituent of natural gas is methane $CH_4$. Methane reacts very rapidly with the oxygen $O_2$ of the ambient air. The general reaction of combustion of methane with oxygen is the following:

$$CH_4 + 2O_2 \rightarrow CO_2 + 2H_2O$$

In reality, decomposition of methane in the presence of oxygen involves a very complex mechanism. This mechanism comprises more than 200 steps including the formation of intermediary compounds such as the free radicals O°, H° and OH°. A flame of methane such as 4 in FIGS. 1 and 2 can be divided into three distinct zones:

- a first, pre-heating zone extending from the cold wall 35 of the reactor 5 to the flame 4;
- a second, reaction zone represented by the visible flame 4; and
- within the flame 4, a third recombination zone in which the excess free radicals O°, H° and OH°, created in the second zone (visible flame 4) are destroyed by recombination reactions.

In the second reaction zone, the temperature may reach 1000° K/ to 1500° K. At that temperature, the radicals O°, H° and OH° are responsible, in the third zone, for the chain of reactions, and the recombination reactions, including the phenol oxidation reactions, are dominated by the free radical reactions. Again, as indicated in the foregoing description, the high temperature of the flame 4 enables completion of the process of oxidation, in liquid phase, of the organic substances by means of the excess oxygen present in the flame 4.

In general, the products resulting from the oxidation of phenol are organic salts, simplified forms of biodegradable compounds or, in the presence of complete oxidation, carbon dioxide and water. The tendency of phenol $C_6H_5OH$ to react is directly related to the polarization of the two bonds C-O and O-H and the presence of two pairs of free electrons on the oxygen atom. The two following types of behaviour can therefore be anticipated:

a) rupture of the bond O-H:

$$C_6H_5O\text{-}H \rightarrow C_6H_5O^- \; H^+$$

b) rupture of the bond C-O:

$$C_6H_5O\text{-}H \rightarrow C_6H_5^+ OH^-$$

Figure 4:
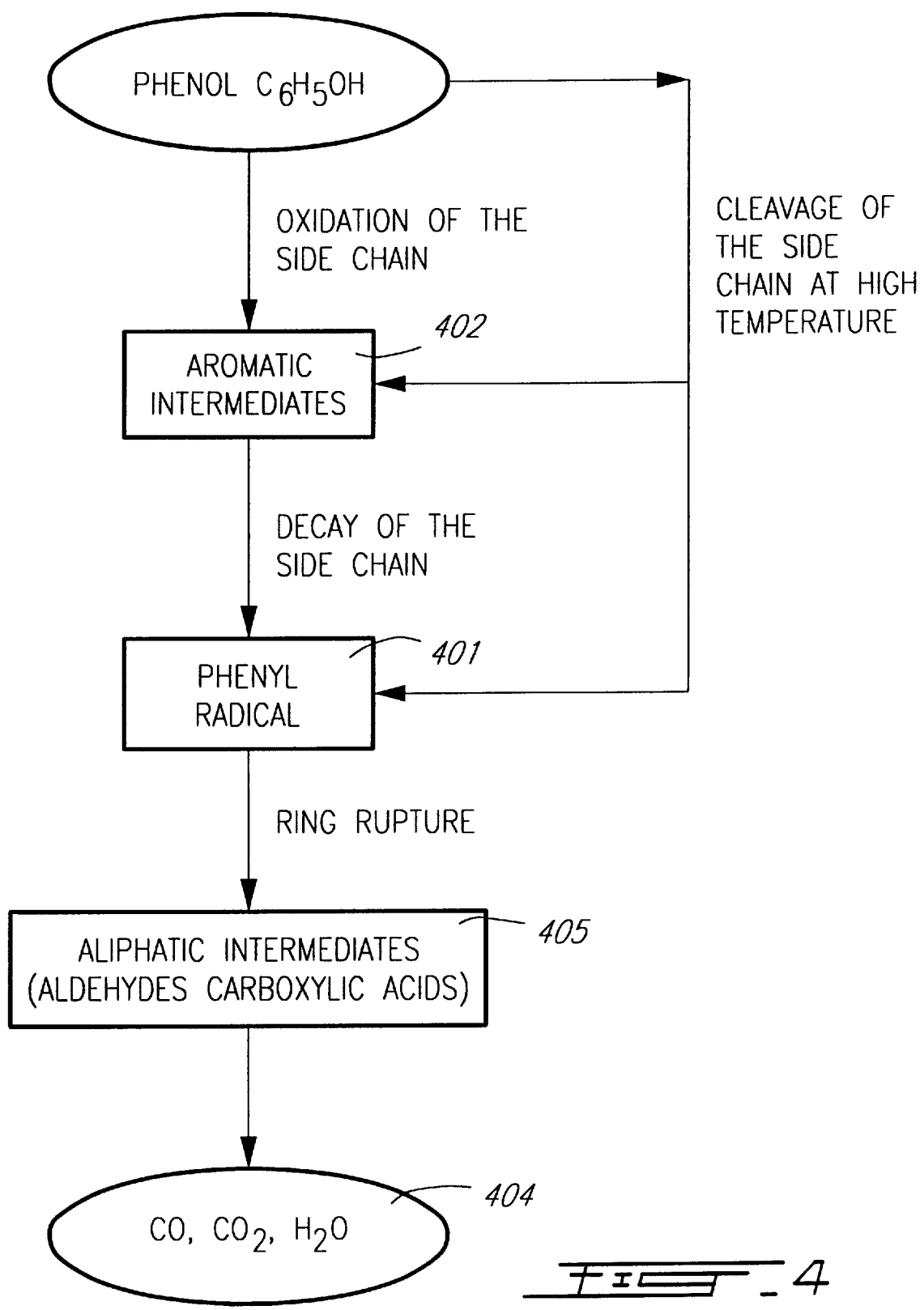
FIG. 4 is a flow chart showing the mechanism ruling the oxidation of phenol $C_6H_5OH$.

Oxidation of phenol in aqueous phase follows a free radical mechanism. Consequently, the speed of reaction is slow during the initial induction period. However, this initial induction period is followed by a fast period during which the speed of reaction is high and the major part of the process of degradation of the phenol occurs. FIG. 4 shows the main steps involved in the mechanism ruling the oxidation of phenol $C_6H_5OH$. At high temperature, the side chain of phenol is decayed; this decay is characterized by the rupture of the bond O-H, and leads to the formation of a phenyl radical (step 401) in passing by a sequence of formation of unstable aromatic intermediates (step 402). The oxidation reaction propagates and leads to the rupture of the ring. Accordingly, as phenol disappears, carbon monoxide is produced (step 404). Carbon dioxide is formed (step 404) after a substantial increase of the concentration of carbon monoxide accompanied by a rapid increase of temperature. The formation of these carbon oxides is preceded, in particular, by the formation of aliphatic intermediates (step 405) including aldehydes and carboxylic acids.

In conclusion, in the presence of oxygen $O_2$, phenol $C_6H_5OH$ is involved in the following oxidation reaction:

$$C_6H_5OH + 7O_2 \rightarrow 6CO_2 + 3H_2O$$

EXAMPLE NO. 2

In this example, the said at least one organic substance contaminating the liquid effluent contains a mixture of at least two species, one that can be easily oxidized and the other more refractory. Then, oxidizing may comprise aqueous-phase oxidation reactions proceeding according to a free-radical mechanism and being characterized by an induction period followed by a rapid reaction phase.

Phenol-Toluene is an organic mixture illustrating Example #2. Toluene is the easily oxidized species while phenol is the refractory species.

Figure 7:
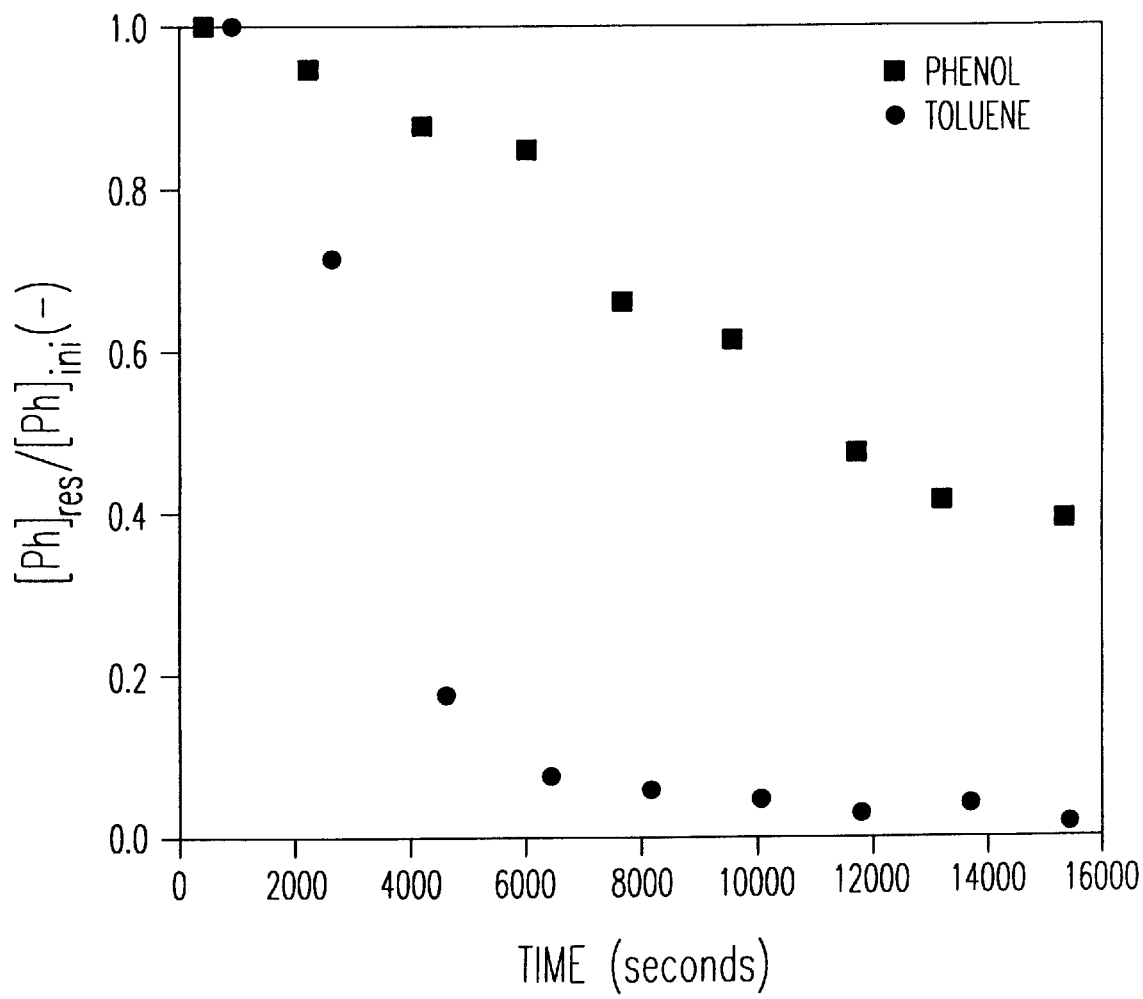
FIG. 7 is a graph showing the evolution with time of the ratio of the residual concentration of organic pollutant versus the initial concentration of organic pollutant for a liquid effluent containing only phenol or containing only toluene.

FIG. 7 shows that, when reacted separately, toluene is much more reactive than phenol under the same operating conditions. In FIG. 7, the initial concentration of phenol is 500 ppm, the initial concentration of toluene is, 500 ppm, the maximum liquid temperature is 75° C., the operating pressure is 101.75 kPa, $[Ph]_{rea}$ is the residual concentration of organic pollutant, $[Ph]_{ini}$ is the initial concentration of organic pollutant, and $[Ph]_{res}/[Ph]_{ini}$ is the organic pollutant concentration ratio.

Figure 8:
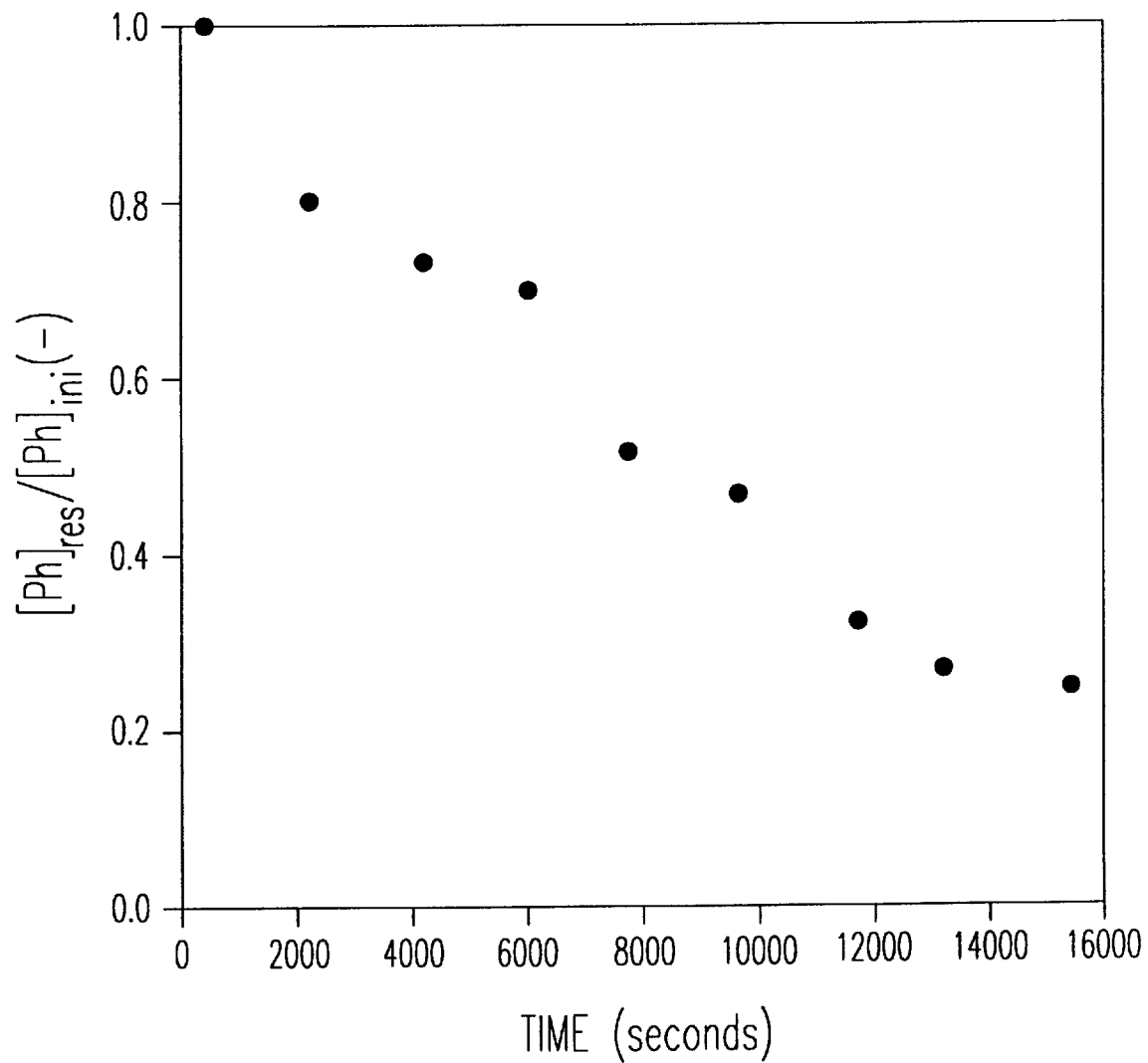
FIG. 8 is a graph showing the evolution with time of the ratio of the residual concentration of organic pollutant versus the initial concentration of organic pollutant for a liquid effluent containing a mixture of phenol and toluene

FIG. 8 demonstrates that phenol destruction efficiency is enhanced significantly when toluene and phenol are reacted simultaneously. In that case, both toluene and phenol generate free radicals during the oxidation mechanism. As phenol and toluene are "parents", since they belong to the same series of carbon-hydrogen compounds based on the benzene ring, the oxidation rate of phenol is increased because the total amount of free radicals available in the aqueous phase is higher than when phenol reacts alone. In FIG. 8, the initial concentration of phenol is 500 ppm, the maximum liquid temperature is 75° C., the operating pressure is 101.75 kPa, $[Ph]_{rea}$ is the residual concentration of organic pollutant, $[Ph]_{ini}$ is the initial concentration of organic pollutant, and $[Ph]_{res}/[Ph]_{ini}$ is the organic pollutant concentration ratio.

Therefore, to enhance the phenol destruction efficiency of a liquid effluent contaminated by phenol only, toluene can be added to the liquid effluent to allow toluene and phenol to react simultaneously.

Although the present invention has been described hereinabove with reference to a preferred embodiment thereof, this embodiment can be modified at will, within the scope of the appended claims, without departing from the spirit and nature of the subject invention.

What is claimed is:

1. An installation for decontaminating a liquid effluent contaminated by at least one organic substance, comprising:
    a reactor having an outlet and an inner, generally cylindrical wall defining a geometrical axis;
    a burner supplied with a gaseous combustible and a comburant gas to produce in said reactor a flame centered on said geometrical axis and including free radicals and oxygen $O_2$;
    liquid effluent supply means for injecting the liquid effluent tangentially in said reactor and producing a helical flow of liquid effluent on the inner, generally cylindrical wall of the reactor; and
    a liquid/air separator for separating liquid and gaseous products leaving the outlet of the reactor.

2. An installation for decontaminating a liquid effluent as recited in claim 1, wherein said gaseous combustible comprises natural gas, and wherein said comburant gas is selected from the group consisting of ambient air, oxygen-enriched air, and pure oxygen.

3. An installation for decontaminating a liquid effluent as recited in claim 1, wherein said burner comprises means for adjusting the length of the flame.

4. An installation for decontaminating a liquid effluent as recited in claim 1, wherein said reactor, inner wall and geometrical axis are generally horizontal.

5. An installation for decontaminating a liquid effluent as recited in claim 1, wherein said reactor, inner wall and geometrical axis are generally vertical.

6. An installation for decontaminating a liquid effluent as recited in claim 1, in which the inner, generally cylindrical wall of the reactor comprises means for increasing the time of residence in said reactor of the liquid effluent contaminated by at least one organic substance and flowing on said inner, generally cylindrical wall according to said helical flow.

7. An installation for decontaminating a liquid effluent as recited in claim 6, in which said residence time increasing means comprises a helical groove formed on the inner, generally cylindrical wall of the reactor for guiding the helical flow of liquid effluent.

8. An installation for decontaminating a liquid effluent as recited in claim 6, in which said residence time increasing means comprises a grid on the inner, generally cylindrical wall of the reactor for guiding the helical flow of liquid effluent.

9. An installation for decontaminating a liquid effluent as recited in claim 1, in which said liquid effluent supply means comprises means for injecting an oxidizing agent in the reactor.

10. An installation for decontaminating a liquid effluent as recited in claim 1, in which said liquid effluent supply means comprises means for injecting an oxidizing agent generally tangentially in the reactor, said oxidizing agent being in liquid phase.

11. An installation for decontaminating a liquid effluent contaminated by at least one organic substance, comprising:
    a reactor having an outlet and an inner wall defining a geometrical axis;
    a burner supplied with a gaseous combustible to produce in said reactor a flame centered on said geometrical axis and including free radicals and oxygen;
    liquid effluent supply means for producing a flow of said liquid effluent on the inner wall of the reactor to cause a direct contact between (a) the flame containing free radicals and oxygen and (b) the organic substance contaminating the liquid effluent of said flow, and thereby oxidize in liquid phase the organic substance contaminating the liquid effluent; and
    a liquid/air separator for separating liquid and gaseous products leaving the outlet of the reactor.

12. An installation for decontaminating a liquid effluent as recited in claim 11, in which said liquid effluent contains an organic mixture of a first easily oxidized species and a second refractory species, so that aqueous-phase oxidation reactions proceeding according to a free-radical mechanism and being characterized by an induction period followed by a rapid reaction phase occur in the reactor.

13. An installation for decontaminating a liquid effluent as recited in claim 12, in which said first species comprises toluene and the second species comprises phenol.

* * * * *